United States Patent Office 3,509,121
Patented Apr. 28, 1970

3,509,121
SEPARATION OF LIQUOR MATERIALS
BY DIFFUSION
Julius Benko, Quebec City, Quebec, Canada, assignor, by mesne assignments, to Dryden Chemicals Limited, Oakville, Ontario, Canada, a Canadian company
No Drawing. Filed Sept. 6, 1967, Ser. No. 665,729
Int. Cl. C07g 1/00
U.S. Cl. 260—124                                    18 Claims

ABSTRACT OF THE DISCLOSURE

The invention relates to a method of separating components according to their molecular sizes of substances comprising spent sulphite liquor, kraft liquor, and bark extracts by passing alternately a solution of such a substance and wash water through a fractionating bed of particles of +20–100 mesh of a cation exchange resin having 2 to 8% cross-linkage whereby separation occurs as a result of a diffusion procedure.

BACKGROUND OF THE INVENTION

Field of the invention

The invention is in the general field of separation of different substances from a solution thereof by passage through a fractionating column.

A specific field relates to the fractionation of spent sulphite liquor and of chemically treated products obtainable therefrom.

Description of the prior art

Separation of the components of spent sulphite liquor on ion exchange resin beds into the two major fractions, namely, lignosulphonates and carbohydrates, appears to have been first reported by V. F. Felicetta et al., in an article for the Technical Association of the Pulp and Paper Industry (TAPPI) vol. 42, No. 6, June 1959. The basic aim of these workers appears to have been to obtain the carbohydrate fraction as pure as possible without particular regard to the main lignosulphonate fraction.

The present inventor delivered a paper at a meeting of the American Chemical Society in 1960, in which ion exclusion was described as a tool in the analytical investigation of spent sulphite liquors.

Felicetta et al. described preliminary fractionation of spent sulphite liquor on an ion exchange resin bed in TAPPI, vol. 50, No. 4, April 1967. In this article, as in the previous one by the same authors, the aim has been to separate the two main components of the liquor as completely as possible. Since complete separation of the low molecular weight lignosulphonates from the reducing sugars is extremely difficult by means of all known fractionation procedures, a remarkable sacrifice in the otherwise obtainable rates of production was necessary to at least approach the objective of these workers. It appears that they did not examine the main lignosulphonate fraction, comprising the polymer lignosulphonate material, nor did they attempt to fractionate chemically treated spent sulphite liquor solids on ion exchange resin beds.

Felicetta et al. prefer to use in their fractionation work ion exchange resins with 8% crosslinkage since they wish to separate the mono and dimeric lignosulphonates and the reducing sugars from the lignosulphonate polymers. They aim for a large number of theoretical plates to obtain the required fractionation. This necessitates a resin bed depth of about 5530 mm., which in turn, reduces the obtainable rate of flow through the bed and permits about 40 grams of spent sulphite liquor solids to be fractionated on one liter resin bed in 24 hours.

SUMMARY OF THE INVENTION

The invention comprises broadly a method of separating different substances by passing a solution containing them through a fractionating bed composed of particles of a cation exchange resin having 2 to 8% crosslinkage. The particles are in the size range of +20–100 mesh. Ion exchange reactions are purposely avoided.

It has been found that the use of particular ion exchange resin beds results in a new and flexible fractionation procedure for spent sulphite liquors as obtained from the pulp mill and also following a variety of chemical treatments of the liquor solids. The present invention is characterized by much shorter contact periods in the resin beds as well as by much higher concentrations and rates of productivity than have hitherto been considered possible. The invention results in an industrially acceptable and useful fractionation of spent sulphite liquors or chemically treated products derived therefrom. Rates of production may be increased as much as 100 fold by practicing the method of the present invention.

DESCRIPTION OF THE PREFERRED EMBODIMENTS

While the invention will be described with particular reference to the fractionation of spent sulphite liquor, it will be understood that it may be applied to the fractionation of various other substances, such as kraft lignin, vanillin plant effluent, and bark extracts in aqueous and alcohol solution.

The spent sulphite liquor contains two major components, namely, about 65% lignosulphonates and about 30% carbohydrates and organic acids derived therefrom. The balance of the material, containing about 5% of spent sulphite liquor solids, consists of a mixture of acetic and formic acids, organic resins, a variety of other organic materials and of inorganics.

Both lignosulphonates and carbohydrates are collective terms and are used to describe groups of compounds which, in spent sulphite liquors of different origins or having different after-treatments, may show extremely different physical and chemical properties. Such differences are primarily the consequence of the different macromolecular arrangements of the relatively few building units of the lignosulphonates and of the carbohydrates.

It is rather obvious that in such a crude mixture as spent sulphite liquor or chemically treated products obtained therefrom, not all of the components will behave in an identical manner for most of the intended applications or utilizations. It is known, for instance, that in promoting dispersion of a huge variety of both organic and inorganic compounds in water or in several organic solvents, the lignosulphonates are really effective components of the spent sulphite liquor. Not all lignosulphonates show identical effectiveness in their dispersing properties, and, therefore, much work has been invested in the prepartion of improved dispersants for specific applications from the crude, untreated spent sulphite liquor. For other end uses, basically in replacing carbohydrates or sugar acids obtainable therefrom, the carbohydrate fractions of the spent sulphite liquor are the responsible ones. Utilizations of this type are yeast growing, alcohol fermentation, aldonic acid synthesis and humectant applications. Acetic and formic acids, organic resins and other organic materials and the usual inorganic components contained in the spent sulphite liquor and together amounting to about 5% of the total solids are not responsible, primarily due to their very low quantities, for any known spent sulphite liquor utilization. On the contrary, some of these components may constitute at occasion obstacles to some specific applications and then have either to be removed or to be replaced by other, less bothersome components. Replacing of bothersome components for indifferent ones is the case when calcium is exchanged for sodium or ammonia for a number of applications, while complete removal of the inorganics may be performed to reduce hygroscopicity of spent sulphite liquor derived solids.

For the majority of spent sulphite liquor utilization, it is not necessary to separate the major effective component from the major ineffective component. Thus, the carbohydrates or sugar acids derived therefrom may remain and, therefore, unfractionated spent sulphite liquor may be used for the majority of dispersant applications. Similarly, the lignosulphonates do not need to be separated from the carbohydrates in such applications as yeast growing, alcohol fermentation or aldonic acid synthesis. The ineffective component is, in such cases, merely a diluent and is allowed to remain in the spent sulphite liquor or in the products derived therefrom, primarily for economic consideration. In other instances, however, fractionation of spent sulphite liquor or chemically treated products derived therefrom becomes a necessity, either because some of the components are not merely ineffective diluents but are actually harmful for the intended application, or because the preferable, useful fraction of the spent sulphite liquor is excessively diluted by the ineffective components, unless properly fractionated. Such instances are encountered, for instance, while using humectants derived from spent sulphite liquors in dye pastes, or while using improved dispersants for the dispersion of dyes.

Although fractionation is a many shaped tool in chemical processing, only two fractionation processes, namely, the calcium precipitation process and the sulphuric acid precipitation process have been used for about the last 35 and 15 years, respectively, in the fractionation of spent sulphite liquor and of chemically treated products obtainable therefrom. A third fractionation process in industrial use is a more recent development and consists of the removal of the high molecular weight lignosulphonates on hide substance and of their subsequent recovery. While the above fractionation processes are useful in the production of fractionated lignosulphonate materials, these methods are quite inflexible both in respect to the sort of spent sulphite liquor materials which may be fractionated by these processes and also in respect to the percentage distribution of the solids in the resulting fractions.

Several other fractionating procedures have been developed but have failed to gain industrial application in spite of the fact that the methods referred to appear to be more flexible in producing the desired fractions of spent sulphite liquor solids than the three methods referred to above. Such fractionation methods are characterized by:

(a) Fractional precipitation with organic amines.

(b) Organic solvent extraction, using one solvent or a mixture of solvents.

(c) Using semi-permeable membranes in a variety of ways.

In an article in Industrial Engineering Chemistry vol. 45, 1953, W. C. Bauman et al. disclose that separation of ionic and non-ionic particles may be obtained on specific ion exchange resin beds when operated in a particular manner. The separation of ionic and non-ionic particles derives from the fact that during the passage of the sample material through the resin bed there is, at first, a high concentration difference in the concentration of the interstitial water, in which all dissolved sample material is found and in the concentration of the resin liquid, which is nil. This primarily existing concentration difference in the two liquid phases tends to equalize and therefore some of the dissolved particles diffuse into the resin liquid.

If the particles in the interstitial liquid are of about equal size, but some ionic and other non-ionic in nature, then the Donnan membrane effect becomes the principal governing factor in determining which particles will diffuse into the resin liquid and which are to remain in the interstitial liquid. In such case, the ionic particles will be hindered in diffusing into the resin liquid by the electrostatic forces which originate from the functional chemical groups on the surface of the individual resin spheres. Therefore, the ionic particles become excluded from the resin liquid, pass through the resin column fast and appear first in the effluent, while the existing concentration gradient forces the non-ionic particles to diffuse into the resin liquid. Once the interstitial liquid, containing the ionic particles, passes through the column and has been replaced with water, the non-ionic particles will gradually diffuse back into the interstitial liquid and will finally also appear in the effluent. Separation of particles on an ion exchange resin bed in the above manner is called ion exclusion.

Ion exclusion cannot be the major physico-chemical force in the separation of lignosulphonate macromolecules according to their molecular size on resin beds operated in a manner similar to that described above, nor in the fractionation of a variety of chemically treated spent sulphite liquor materials, in which all particles are acid, since their original sugar content has been converted to a mixture of sugar acids. In carrying out the method of the present invention, ion exclusion could only be claimed as one of the driving forces when chemically untreated spent sulphite liquor, containing lignosulphonates as ionic particles and sugars as non-ionic particles is fractionated. Yet, during such fractionation, the lignosulphonates are simultaneously also fractionated according to their molecular size by some other driving force.

In accordance with the invention, there is provided a fractionation bed comprising a column of particles of a cation exchange resin. This resin material serves as the support of the stationary liquid phase in the fractionation column and while its chemical composition is relatively unimportant its physical characteristics are quite important for a number of reasons, which may be indicated as follows:

(a) The percentage of the crosslinkage in the resin determines its porosity. The resin becomes less porous with increasing crosslinkage. The more porous the resin, the less selective it becomes.

(b) With the increasing crosslinkage, the moisture content of the resin decreases and the density of the functional acid groups on the surface of the resin increases. The amount of moisture in the resin particles sets a limit to the amount of material which may diffuse into the resin. The decreasing porosity and the simultaneously increasing density of acid functional groups on the surface of resin having a high degree of cross-linkage tends to block diffusion.

(c) The particle size of the resin affects the efficiency of a given quantity of resin because it determines under otherwise identical conditions the obtainable rates of flow through the resin column.

(d) The particle size of the resin material affects its physical stability and thus its service life. Smaller resin particles are known to have a longer service life under otherwise identical conditions.

(e) Equilibria between the resin-water and the interstitial water, i.e., between the water contained in the individual resin spheres and the water surrounding such resin spheres, are obtained substantially faster with decreasing particle size.

The following resins are suitable for the purpose of the present invention and are given by way of example:

Sulphonated styrene divinylbenzene (sold under the trademark "Dowex 50" by Dow Chemical Company), Carboxylic methacrylate (sold under the trademark "Amberlite IRC–50" by Rohm & Haas Company).

In accordance with the invention, fractionation by means of diffusion is performed on appropriate ion exchange resin beds which, subject to certain specified characteristics, are prepared in the manner usual for ion exchange operations. The concentrated aqueous solution of the unfractionated material is placed on the top of the bed and allowed to flow downwardly through the resin column. It is followed by a stream of water. The fractionated material is recovered in the subsequent aliquots of the effluent.

Fractionation of, for instance, lignosulphonate polymers according to their molecular size is obtained on the ion exchange resin bed because some such polymers diffuse into the resin liquid. Since the rate of diffusion is known to be related in a very general manner inversely to the particle radius and thus to the molecular size, the equation of Stokes-Einstein explains the experimentally established fact that separation of the particles according to their molecular sizes is obtained in all cases and that the particles of largest molecular size appear in the effluent first and the particles with smallest molecular size leave the fractionation column last. While in the present manner of operation the molecular size appears to be the most important criterion, molecular sieve operation is not practiced in most of the cases, because under the usual conditions all or most lignosulphonate polymers are able to diffuse into the resin spheres and fractionation is obtained by the differences in diffusion rates rather than by molecular sieve effects. It is realized, however, that in the case of very large molecular size particles and in the case of ion exchange resins of lesser porosity, the Donnan membrane effect and/or molecular sieve phenomenon may also become a factor in the progress of separation.

It appears that in the present way of operation the resin column functions as an unconventional diffusion unit, which has an unusually large membrane area provided by the total surface of the individual resin spheres. The interstitial liquid flows through a tortuous path provided by the resin particles. One liter of ion exchange resin of mesh-size 50–100 and of 2–4% crosslinkage provides a membrane area of about 8 square meters and the particles in the solution which are to be fractionated are on the average less than about 0.01 mm. from the membrane surface at all times. The high concentration gradient between the interstitial liquid, which contains, for instance, the spent sulphite liquor solids at 40–50% solids concentration, and between the resin liquid promote further the fast progress of fractionation.

As a consequence of the unusual arrangement of the membrane surface, the extent of the overall dilution in the process is reduced since the volume of the diffusate is limited primarily to the volume of the resin water. A further consequence of the unusual membrane arrangement is that the unit is operated in short, batchwise operational cycles instead of the continuous operation commonly used in dialysis units. Only one stream enters a resin bed operated as a diffusion unit, in which the feed of unfractionated material alternates with water, instead of the feed and water moving in separate streams continuously. Similarly, in the effluent stream the different fractions appear in consecutive order and all fractions are recovered, usually on volumetric basis, from the same stream.

The diffusate passes twice through the membrane surface, first when it moves from the interstitial liquid, which in that case consists of the concentrated feed, into the resin water and the second time when it diffuses back into the interstitial water, which has replaced the concentrated feed. This second step of the diffusion causes the major portion of the overall dilution in the process, which amounts to about 2–4 fold of the original volume of the concentrated, unfractionated spent sulphite liquor.

The manner of fractionation obtained on an air blown caustic heat treated spent sulphite liquor material, which was fractionated according to the disclosures of the present invention, is shown in Table I.

TABLE I

| Fraction | Percentage Total Solids | Molecular Weight | Equivalent Weight |
|---|---|---|---|
| I | 28.2 | 12,000 | 286 |
| II | 16.0 | 8,900 | 202 |
| III | 18.0 | 4,700 | 141 |
| IV | 16.7 | 2,200 | 114 |
| V | 11.9 | ¹1,000 | 114 |
| VI | 9.2 | ¹1,000 | 101 |

¹ Approx.

The fractionation was performed on a bed of 2% crosslinked sulfonated styrene divinylbenzene resin of +50–100 mesh size particles in sodium salt form, the bed having a depth of 1350 mm. The bed was charged with 80 grams solids per one liter resin bed and the fractionation was completed in 30 minutes. Fractions IV–VI contain mostly sugar acids and only a small proportion of lignosulphonates of the given molecular weight.

It is desirable to operate the fractionation process in accordance with the invention by observing the following conditions in order to avoid difficulties in operation and to obtain maximum yields:

(1) Interphase mixing both at the top and at the bottom of the resin bed should be kept to a minimum.

(2) The unfractionated material is fed to the top of the bed in as concentrated a solution as possible consistent with obtaining appropriate rates of flow through the bed. Undue dilution of the unfractionated material entails excessive dilution during the fractionation process, while excessively high concentration becomes a limiting factor in obtaining the desirable high rates of flow.

(3) Channeling, or non-uniform passage of the liquid flow through the bed should be avoided by keeping the bed in a uniformly loose state and by exercising care in the feed of unfractionated material and wash water on the top of the bed.

(4) Gas or air pockets or bubbles in the bed should be avoided.

(5) Depth of the bed should be chosen so that it does not become a serious limiting factor in the operation.

(6) The resin bed should be neutralized with the same cation as contained in the material being fractionated, in order to avoid ion exchange reactions during the process.

It takes about 30 minutes to complete a fractionation cycle at room temperature in the manner outlined, if the depth of the resin bed is 1.3 meters and close to 100 grams solids are fractionated on one liter resin bed. It takes only about 20 minutes to perform the same operation with identical results at about 50° C. Further reduction of the period necessary to complete one fractionation cycle has been shown to be possible by the following means:

(1) Use of higher temperatures in the resin bed; up to about 90° C.

(2) Use of slight positive pressure on the top of the resin bed.

(3) Reduction of the depth of the resin.

The percentage of crosslinkage in the resin for the purposes of the invention is 2 to 8, preferably, 2 to 4.

In order to establish the relationship between the crosslinkage of the resin and the extent of fractionation obtained on such resin beds, a series of experiments were conducted on resin columns containing ion exchange resins of different crosslinkage. In each experiment, the resin was contained in columns of 65 mm. inside diameter and the depth of the resin bed was 150 mm. On the 500 ml. resin volume thus prepared, 125 ml. concentrated sample material containing 44 grams of solids in each case were fractionated under the conditions and with the results indicated in Tables II, III and IV. Sample materials as well as all ion exchange resins, were in sodium salt form.

The analytical data provided in the tables indicate that the extent of fractionation decreases with increasing crosslinkage of the resin. Dye dispersant evaluation of air blown caustic heat treated spent sulphite liquor materials, as shown in Table IV, indicates that fractionation on resins having 2 and 4% crosslinkage results in a remarkable and substantially identical improvement of the dye dispersing properties. Other application tests as well as the analytical data shown in Table II indicate preference of use of resins containing up to 4% but having less than 8% crosslinkage.

The data in this table indicate that the variation in mesh size has no substantial effect upon the resulting fractionation, but it has a very marked effect upon the length of time necessary to perform such a fractionation. While very fast and substantially identical rates of flow are obtained through resin columns containing ion exchange resins of mesh size +20–50 or +50–100, the TABLE II.—THE EFFECT OF THE CROSSLINKAGE OF SULPHONATED STYRENE-DIVINYLBENZENE CATION EXCHANGE RESINS UPON THE PROGRESS OF FRACTIONATION OBTAINED THEREON

| Experiment No. | Characteristics of the resin | | Average rate of flow, ml./cm.²/min. | Duration of fractionation cycle, min. | Percentage solids distribution | | Molecular weights | | Equivalent Weights | |
|---|---|---|---|---|---|---|---|---|---|---|
| | Percent crosslinkage | Mesh size | | | High M.W. | Low M.W. | High M.W. | Low M.W. | High M.W. | Low M.W |
| 1 | 2 | 50-100 | 1.24 | 22 | 34.4 | 65.6 | 5,470 | 2,800 | 217 | 139 |
| 2 | 2 | 50-100 | 2.57 | 10 | 50.0 | 50.0 | 5,180 | 2,980 | 199 | 136 |
| 3 | 4 | 50-100 | 1.13 | 22 | 35.9 | 64.1 | 4,700 | 3,040 | 205 | 144 |
| 4 | 4 | 50-100 | 2.58 | 10 | 50.0 | 50.0 | 4,450 | 3,250 | 188 | 142 |
| 5 | 8 | 50-100 | 0.76 | 29 | 50.0 | 50.0 | 4,200 | 3,460 | 174 | 154 |
| 6 | 16 | 50-100 | 1.10 | 15 | 41.8 | 58.2 | 4,040 | 3,490 | 169 | 160 |

Sample material: air blown, caustic heat treated spent sulphite liquor solids.

TABLE III.—FRACTIONATION OF CHEMICALLY UNTREATED SPENT SULPHITE LIQUOR SOLIDS ON SULPHONATED STYRENE-DIVINYLBENZENE CATION EXCHANGE RESIN BEDS OF VARYING CROSSLINKAGE

| Experiment No. | Cross-linkage, percent | Mesh size | Average rate of flow ml./cm.²/min. | Duration of fractionation cycle, min. | Solids distribution in fractions | | Benzidine sugar content in fractions | |
|---|---|---|---|---|---|---|---|---|
| | | | | | High MW | Low MW | High MW | Low MW |
| 1 | 2 | 50-100 | 1.22 | 21 | 61.7 | 38.3 | 8.1 | 38.9 |
| 2 | 2 | 50-100 | 0.29 | 72 | 63.6 | 37.4 | 8.4 | 37.5 |
| 3 | 4 | 50-100 | 1.50 | 21 | 51.3 | 48.7 | 4.8 | 35.8 |
| 4 | 8 | 50-100 | 0.80 | 29 | 52.1 | 47.9 | 9.6 | 37.8 |
| 5 | 10 | 50-100 | 0.78 | 31 | 55.8 | 44.2 | 13.9 | 29.8 |
| 6 | 16 | 50-100 | 1.67 | 21 | 50.0 | 50.0 | 18.7 | 23.7 |

NOTE.—The presence of some reducing groups on lignosulphonate macromolecules is known and for the purposes of accurate sugar analysis it is corrected for as described by J. Giguere in TAPPI, Vol. 45, 1962.

TABLE IV.—EVALUATION OF DYE DISPERSANT PROPERTIES OF AIR BLOWN CAUSTIC HEAT TREATED SPENT SULPHITE LIQUOR FRACTIONS PREPARED ON ION EXCLUSION RESIN BEDS CONTAINING SULPHONATED STYRENE-DIVINYLBENZENE CATION EXCHANGE RESINS OF DIFFERENT CROSSLINKAGES

| Experiment No. | Crosslinkage, percent | Mesh size | Flow rate, ml./cm.²/min. | Duration of fractionation cycle, min. | Dispersion | | Heat Stability | |
|---|---|---|---|---|---|---|---|---|
| | | | | | TFF, sec. | Residue, mg. | TFF, sec. | Residue, mg. |
| 1 | 2 | 50-100 | 1.28 | 20 | 1.5 | 68.2 | 2.0 | 74.5 |
| 2 | 4 | 50-100 | 1.28 | 20 | 1.0 | 73.6 | 1.5 | 76.5 |
| 3 | 8 | 50-100 | 1.28 | 20 | 60.0 | 602.7 | 8.5 | 551.1 |

The effect of mesh size of the resins employed upon the length of fractionation cycle is shown in the experiments listed in Table V. The resin was sulfonated styrene divinylbenzene. The sample materials and the resin beds were in all cases in sodium salt form, and 250 ml. concentrated sample material containing 88 grams spent sulphite liquor solids was used for one liter resin bed.

maximum rates of flow obtainable through resin beds of mesh size +100–200 are drastically reduced. Therefore, the use of ion exchange resins having a mesh size of +100–200 or finer becomes impractical for fractionation purposes according to the present invention. The optimum mesh size is thus established as +50–100, since mesh sizes +20–50 or coarser are expected to have a shorter service

TABLE V.—EFFECT OF MESH SIZE UPON FRACTIONATION

| Experiment No. | Characteristics of the resin | | Average rate of flow, ml./cm.²/min. | Duration of fractionation cycle, min. | Percentage solids distribution | | Molecular weights | | Equivalent Weights | |
|---|---|---|---|---|---|---|---|---|---|---|
| | Percent crosslinkage | Mesh size | | | High M.W. | Low M.W. | High M.W. | Low M.W. | High M.W. | Low M.W. |
| 1 | 2 | 50-100 | 6.63 | 15½ | 50.0 | 50.0 | 5,680 | 2,280 | 199 | 132 |
| 2 | 2 | 100-200 | 0.36 | 70 | 50.0 | 50.0 | 11,100 | 3,400 | 202 | 134 |
| 3 | 2 | 100-200 | 0.25 | 360 | 50.0 | 50.0 | 6,000 | 2,100 | 237 | 168 |
| 4 | 4 | 20-50 | 8.85 | 9 | 50.0 | 50.0 | 7,250 | 5,450 | 194 | 141 |
| 4 | 4 | 20-50 | 6.68 | 13 | 72.4 | 27.6 | 4,450 | 3,430 | 183 | 122 |
| 6 | 4 | 20-50 | 3.19 | 23 | 50.0 | 50.0 | 8,100 | 5,050 | 191 | 139 |
| 7 | 4 | 50-100 | 3.01 | 30 | 50.0 | 50.0 | 4,040 | 3,240 | 232 | 174 |
| 8 | 4 | 100-200 | 0.34 | 68 | 50.0 | 50.0 | 9,750 | 3,300 | 202 | 128 |

The resin columns were 65 mm. i.d. and the depth of resin was 600 mm. in all cases except for Experiments 2 and 8 in which resin depths of 150 mm. were used.

Three different caustic heat treated spent sulphite liquor materials were used. Identical samples were used in Experiments 1 and 5, 3 and 7, and 2, 4, 6 and 8.

The rates of flow were the fastest obtainable in Experiments 2, 3 and 8; that is, in the case of +100–200 mesh size resins, while the rates of flow were adjusted to the values shown in all other cases and do not represent the fastest obtainable values.

life than mesh size +50–100 will have under otherwise identical conditions.

The table also indicates that variations in the cycling time have but a slight influence upon the extent of fractionation obtained under the described experimental conditions. It is thus indicated that even the shortest fractionation period of only 9 minutes still provides a sufficient contact period on the resin bed for fractionation in the sense of the present invention.

The influence of the depth of the resin bed upon the extent of fractionation obtainable thereon while using the unconventionally low sample to resin volume ratios and the correspondingly high throughput rates, which are the characteristic features of this invention, are reflected by the data shown in Table VI.

fractionation cycle, amounting to about 12% of the total volume instead of about 25%, as it is in the case of the 2% crosslinked resin, when loaded with about 100 gram solids per 1 liter resin bed.

TABLE VI.—EFFECT OF RESIN BED'S DEPTH UPON FRACTIONATION

| Experiment No. | Characteristics of the resin | | Depth of resin bed, mm. | Average rate of flow, ml./cm.²/min. | Duration of fractionation cycle, min. | Percentage solids distribution | | Molecular weights | | Equivalent weights | |
|---|---|---|---|---|---|---|---|---|---|---|---|
| | Percent crosslinkage | Mesh size | | | | High MW | Low MW | High MW | Low MW | High MW | Low MW |
| 1 | 2 | 50–100 | 150 | 2.57 | 10 | 50.0 | 50.0 | 5,180 | 2,980 | 199 | 136 |
| 2 | 2 | 50–100 | 600 | 6.68 | 15½ | 50.0 | 50.0 | 5,680 | 2,280 | 199 | 132 |
| 3 | 2 | 50–100 | 1,200 | 9.95 | *19½ | 50.0 | 50.0 | 5,800 | 2,040 | 201 | 133 |
| 4 | 2 | 50–100 | 2,180 | 2.27 | *167 | 50.0 | 50.0 | 9,000 | 2,840 | 204 | 132 |
| 5 | 4 | 50–100 | 600 | 8.85 | 9 | 50.0 | 50.0 | 7,250 | 5,450 | 194 | 141 |

(1) Figures marked with asterisks designate the shortest obtainable cycling periods under the given set of conditions.

(2) Two different caustic heat treated spent sulphite liquor materials were used, one in Experiments 1 to 3 and the other in Experiments 4 and 5. Equivalent weight values of the samples are accidentally identiual, while the molecular weight values are substantially different.

Data presented in Table VI indicate that the increasing depth of the resin bed within the shown limits has no substantial influence upon the manner of fractionation obtainable thereon, but it becomes a limiting factor in respect to the length of the cycling period and thus in respect to the throughput rate of the fractionation column. While it is feasible to improve upon the rates of flow obtainable through resin beds having excessive depths either through performing the fractionation at elevated temperatures, at up to about 90° C., or through the use of a positive pressure on such resin beds and also through the combination of both of these methods, it is not desirable to use resin beds with substantially higher than about 1200 mm. resin depth therein. There is no indication that the fractionation will benefit from the use of resin depths larger than indicated, but the physical wear and crushing of the individual resin particles during the volume changes of the resin bed in the course of the fractionation process increases with the increasing resin depth which is therefore counter-indicated.

From all the criteria presented above, it may be assumed that a desirable example of choice of a resin for fractionation of spent sulphite liquor solids or for chemically treated products obtainable thereof, is a sulfonated styrene-divinylbenzene resin having 2% crosslinkage and +50–100 mesh size. Using the said resin in fractionating columns of appropriate size, in which the depth of the resin does not exceed about 1200 mm. cycling periods of about 20 minutes may be obtained. Under continuous operation and allowing 20% of the total operational time for backwashing the resin bed at regular intervals, about 5000 g. solids may be fractionated on one liter resin bed in 24 hours, or about 310 lbs. solids on one cubic foot resin bed in 24 hours.

The use of the corresponding sulfonated styrene-divinylbenzene ion exchange resin having 4% crosslinkage instead of 2% under otherwise identical conditions results in two substantial advantages and in a small disadvantage. The adherent advantages of using 4% crosslinked resin are:

(a) Lesser volume change of the resin bed during the (b) Lesser overall dilution during the fractionation process, amounting to about threefold increase in the volume with the crosslinkage of 4% instead of the approximate fourfold increase in the volume with the resin having a crosslinkage of 2%.

The disadvantage of using the 4% crosslinked resin over the use of the 2% crosslinked one is that the resulting fractionation is somewhat lesser in the former than in the latter case. While the decrease in the sharpness of the fractionation is indicated by the analytical data, such a decrease does not show up in end use properties thus far evaluated and, therefore, the use of the 4% crosslinked resin is quite appropriate since the advantages connected to its use are substantial while the disadvantage appears to be negligible. The desirability to reduce overall dilution in the process is obvious, while the benefits from reduced volume changes of the resin bed during the fractionation are a more uniform rate of flow through the resin bed during the fractionation cycle and, probably, also a longer service life of the ion exchange resin.

The use of an ion exchange resin having 8% crosslinkage is practical for chemically untreated spent sulphite liquor materials and in cases when fractionation of lignosulphonate polymers is not aimed at, but merely their separation from the mono and dimer lignosulphonates and from the reducing sugars and inorganics. It is interesting to observe from the data shown in Tables II and III that chemically untreated spent sulphite liquor solids are remarkably better fractionated on an 8% crosslinked resin bed than chemically treated spent sulphite liquor solids. The separation of the reducing sugars from the lignosulphonate materials is obtained to a remarkable extent on an 8% crosslinked resin, but the separation of the sugar acids is obtained from the lignosulphonates to a much lesser extent. Dye dispersant evaluation of chemically treated spetnt sulphite liquors solids fractionated on resin beds having different extents of crosslinkage is shown in Table IV and clearly indicates that only 2 and 4% crosslinkages are acceptable for the preparation of substantially improved dye dispersant materials.

The experiments summarized in Tables VII, and VIII and IX were performed in order to establish whether and to what extent the variation of the charge (i.e., of the quantity of dissolved solids being fractionated in one fractionation cycle on one liter resin bed) influences the extent of the resulting fractionation. These experiments also aim to establish the upper limit of charge which may be still fractionated with success on one liter resin bed in one fractionation cycle.

TABLE VII.—THE EFFECT OF VARIATION OF SAMPLE SIZE UPON THE RESULTING FRACTIONATION

Resin bed: Sulfonated styrene-divinylbenzene copolymer, 2% crosslinked, 50–100 mesh size, 60 cm. depth, 6.5 cm. diameter
Sample Material: Air blown, caustic heat treated spent sulphite liquor

| Experiment No. | Charge gram solids on 1 liter resin bed | Duration of fractionation cycle, min. | Average rate of flow, ml./cm.²/min. | Production in 24 hours on 1 liter resin gram solids | Equivalent Weights | | Molecular Weights | |
|---|---|---|---|---|---|---|---|---|
| | | | | | High M.W. fraction | Low M.W. fraction | High M.W. fraction | Low M.W. fraction |
| 1 | 24.2 | 20 | 3.46 | 1,390 | 251 | 129 | 5,800 | 2,040 |
| 2 | 98.8 | 31 | 3.69 | 3,670 | 227 | 147 | 5,100 | 2,320 |
| 3 | 169.8 | 25 | 6.24 | 7,820 | 235 | 146 | 6,740 | 2,800 |
| 4 | 250.8 | 23 | 5.93 | 12,500 | 231 | 144 | 7,300 | 2,700 |

NOTE.—The above experiments were performed in such a way as to obtain 50% of the total solids in the high and in the low molecular weight fractions in each case. In pro-rating the production for 24 hours, 20% of the operational time is allowed for back-washing of the resin bed.

TABLE VIII.—THE EFFECT OF THE VARIATION OF SAMPLE SIZE UPON THE RESULTING FRACTIONATION

Resin bed: Sulfonated styrene-divinylbenzene copolymer, 2% crosslinked, 50-100 mesh size, 80 cm. depth, 6.5 cm. diameter
Sample material: Caustic heat treated spent sulphite liquor

| Experiment No. | Charge gram solids on 1 liter resin bed | Duration of fractionation cycle, min. | Average rate of flow, ml./cm.²/min. | Production in 24 hours on 1 liter resin gram solids | Equivalent Weights High M.W. fraction | Equivalent Weights Low M.W. fraction | Molecular Weights High M.W. fraction | Molecular Weights Low M.W. fraction |
|---|---|---|---|---|---|---|---|---|
| 1 | 30.0 | 14 | 4.36 | 2,470 | 240 | 163 | 4,800 | 2,100 |
| 2 | 50.0 | 13 | 5.20 | 4,430 | 231 | 169 | 4,650 | 3,090 |
| 3 | 70.0 | 22 | 3.54 | 3,670 | 227 | 176 | 4,780 | 3,240 |
| 4 | 100.0 | 20 | 4.52 | 5,760 | 232 | 174 | 4,040 | 2,600 |
| 5 | 140.0 | 29 | 4.40 | 5,560 | 235 | 178 | 4,400 | 1,960 |
| 6 | 180.0 | 34 | 3.63 | 6,100 | 248 | 163 | 4,660 | 2,120 |
| 7 | 220.0 | 54 | 2.73 | 4,690 | 236 | 178 | 5,650 | 2,300 |

Note.—The above experiments were performed in such a way as to obtain 50% of the total solids in both the high and the low molecular weight fraction in each case. In pro-rating the production for 24 hours, 20% of the operational time is allowed for backwashing the resin bed.

TABLE IX.—FRACTIONATING CAPACITY OF THE RESIN BED

Resin bed: Sulfonated styrene-divinylbenzene copolymer, 4% crosslinked, 50-100 mesh-size, 85 cm. depth
Sample material: Caustic heat treated spent sulphite liquor
Charge: 1 liter concentrated liquor, containing 513 g. solids per liter resin bed

| Fraction | Volume, ml. | Percentage solids | Solids, g. | Solids as percentage of total | Equivalent weight | Molecular weight | |
|---|---|---|---|---|---|---|---|
| I | 1,010 | 20.4 | 206.0 | 16.07 | 272 | 5,270 | |
| II | 287 | 42.4 | 121.7 | 9.49 | 260 | 4,780 | |
| III | 245 | 48.9 | 119.9 | 9.35 | 233 | 3,960 | Average E. wt. on Fractions I-V=247 (on 50.89% of total solids). |
| IV | 200 | 51.1 | 102.2 | 7.97 | 232 | 3,800 | |
| V | 200 | 51.4 | 102.8 | 8.01 | 214 | 3,780 | |
| VI | 195 | 53.6 | 104.5 | 8.15 | 215 | 3,390 | |
| VII | 236 | 50.5 | 119.1 | 9.29 | 214 | 3,180 | |
| VIII | 245 | 37.05 | 90.8 | 7.08 | 200 | | |
| IX | 246 | 31.95 | 78.6 | 6.13 | 178 | | |
| X | 245 | 30.2 | 74.0 | 5.77 | 182 | 2,290 | Average E. wt. on Fractions VI-XIV =195 (on 49.05% of total solids). |
| XI | 500 | 17.05 | 85.2 | 6.64 | 180 | | |
| XII | 750 | 15.74 | 43.0 | 3.35 | 180 | | |
| XIII | 2,750 | 1.06 | 29.1 | 2.27 | 185 | | |
| XIV | 4,000 | 0.12 | 4.8 | 0.37 | 288 | | |
| | | | 1,281.7 | 99.94 | | | |

Data presented in Tables VII and VIII indicate that substantial, several fold variations in the charge have but a slight effect upon the resulting fractionation. It is indicated in both tables that, even in the case of the largest charges, fractionation has still progressed in a satisfactory manner and thus while charging one liter resin bed with 500 ml. concentrated chemically treated spent sulphite liquor material, containing 250 grams solids, the charge has not yet exceeded the fractionating capacity of the resin bed. The rate of daily production in such cases becomes about 100 fold more than the fastest rates reported in the literature for the fractionation of spent sulphite liquor solids on ion exchange resin beds. It appears that such 100 fold increased rates of production could not be obtained by any sort of multi-plate column-type fractionation procedure nor could the apparent independence of the extent of fractionation from the sample size be explained in the case of such column-type fractionation processes.

Assuming diffusion as the principal physico-chemical force which effects fractionation while ion exchange resin beds are used for fractionation purposes according to the present invention, the achievement of the said and surprisingly high rates of productivity can satisfactorily be explained. It is known that the progress of diffusion is substantially accelerated by an intimate contact between the dissolved molecules and the membrane surface at all times, which in our case is asured by the use of (a) a huge membrane area
(b) through a flow through a tortuous path, provided by the resin particles in the resin bed,
(c) elevated temperatures, and
(d) high concentration gradients.

Data assembled in Tables VII and VIII indicate that the capacity of the resin beds to fractionate was not exceeded in any of the reported cases. Therefore, the further experiment, described in Table IX, was performed.

In the latter experiment, the resin bed contained 2.5 liters of resin and through it was passed 2.5 liters of the concentrated solution of unfractionated material. The temperature of the resin bed was maintained at close to 45° C. and the experiment was completed in 136 minutes, using the maximum rates of flow obtainable at all times. The shrinkage of the resin bed during the experiment amounted to 22% of its original volume.

Analytical data in Table IX indicate that even while charging 513 gram solids in 1 liter solution through 1 liter resin bed, a substantial fractionation was obtained. This was only possible because the resin water contained in 1 liter resin bed was able to take in and retain about one half of the total charge, or about 256.5 grams of low molecular weight solids. One liter ion exchange resin bed of the type used in the experiment contains about:

| | Ml. |
|---|---|
| Interstitial water | 290 |
| Resin water | 500 |
| Dry sulfonated styrene-divinylbenzene copolymer resin | 210 |

During the fractionation, the resin bed contracts and an overall loss of volume amounting to 22% of the original is observed.

If the loss of volume reduces both the resin water and the interstitial water volume in equal proportions, there is only 360 ml. resin liquid volume left when the resin bed is in its contracted form. Even if we assume that in the experiment described in Table IX the resin bed was excessively charged by the amount of solids contained in Fractions V, VI and VII, the resin liquid had still to retain 191 grams of solids, corresponding to a concentration of 53% (w./v.) in 360 ml. resin liquid. This concentration is equal to the highest concentration reached in the surrounding interstitial liquid. The low molecular weight particles have, however, at identical concentrations higher osmotic pressures than high molecular weight ones. Thus, it is indicated that during the resin bed contraction the loss of volume reduces the interstitial volume to a greater extent than the volume of the resin liquid.

Experimental data further indicate that fractionation goes on until the osmotic pressures in the resin liquid and in the interstitial liquid become nearly equal, which in the studied case has occurred when solid concentrations have also become nearly equal. Equalization of the osmotic pressures between resin liquid and interstitial liquid is obtained by means of diffusion. The Donnan membrane effect, as experimentally shown, does not interfere with the progress of the diffusion in any way, nor should it be expected to interfere since it generally applies at 10–20 fold lower solids concentrations rather than used in the present manner of fractionation. Since the major driving force in the present manner of fractionation on ion exchange resin beds is diffusion, through which the osmotic pressure equalizes in the two liquid volumina of the resin bed, and ion exclusion effect amounts to practically nothing, the fractionation process should properly be called a diffusion process.

The fact that fractionation on ion exchange resin beds operated according to the present invention occurs until the concentration of the low molecular weight material in the resin liquid becomes nearly equal to the concentration of the high molecular weight material passing at the same time in the interstitial space of the resin bed, and both concentration may become up to about 50% solids, implies the following:

(1) The fractionation process is basically a diffusion process.

(2) The fractionating capacity of the resin bed is in direct proportion with the increasing solids concentration of the sample material and it is close to 500 gram solids per one liter resin bed in the case of 50% solids concentration in the unfractionated material.

(3) Performing the fractionation as close to the capacity of the resin bed and using high solids concentrations, as in the case of the experiment summarized in Table IX, makes it possible to perform the fractionation with an overall dilution less than 2 fold of the original sample volume.

(4) The rate of daily production for 1 liter resin bed according to the operational method described in Table IX is only 4,345 grams, because flow rates through the column were slow, due to the high viscosity of the sample material. Flow rates, however, may be improved through the use of higher temperatures and through the use of a positive pressure.

In respect to possible molecular sieve effects obtainable as a function of the crosslinkage of synthetic ion exchange resin beds, Felicetta et al., have established that only mono and dimeric lignosulphonates are able to penetrate into the resin water of 8% crosslinked sulfonated styrene-divinylbenzene resin beds. In accordance with their observation, we also have found that 8% crosslinked resin beds are not suitable for the fractionation of lignosulphonate polymers.

In order to establish whether in the case of 2 and 4% crosslinked resin beds of the same sulfonated styrene-divinylbenzene type, the fractionation of lignosulphonate polymers is obtained by virtue of molecular sieve effects or rather due to differences in the rates of diffusion, experimental work summarized in Table X was carried out.

In a preliminary experiment, four high molecular weight lignosulphonate fractions were prepared according to the process of the present invention and consisting in each case of 50% of the fractionated solids. Two of the original sample materials, of which the high molecular weight fraction was prepared, contained lignosulphonate materials of the usual molecular size, while the other two were polymers, prepared according to the method described in U.S. Patent No. 3,148,177, Sept. 8, 1964. All four high molecular weight fractions were prepared on 2% crosslinked ion exchange resin beds and may have remained either by the reason of molecular sieve effect or because of differences in diffusivity rates in the high molecular weight fratcion.

In the main experiment, high molecular weight fractions prepared from the usual molecular size lignosulphonates and from polymerized lignosulphonates were combined in 1:1 solids ratios and the mixtures of the said polymers were fractionated again according to the process of the present invention on ion exchange resin beds having different crosslinkage percentages. As the data presented in Table X show, the mixture of the high molecular weight fractions was still substantially tractionated on 2% crosslinked resin beds in both cases, although some overlapping has occurred. This shows that the bulk of high molecular weigt materials A and B is still able to penetrate into the resin water and thus the same material was not retained in the high molecular weight fraction because of molecular sieve effects during the preliminary fractionation. The absence of fractionation on the 4% crosslinked resin bed, in turn, indicates that high molecular weight materials A and B is still able to penetrate the 4% crosslinked resin bed by molecular sieve effect. Thus, in the present manner of utilizing ion exchange resin beds for fractionation, molecular sieve effect may or may not be used, and its use is not a prerequisite for successful fractionation.

The assumption that the major physico-chemical force governing the progress of fractionation while resin columns are used according to the present invention is diffusion, is supported by the following experimental facts:

(1) During fractionation according to the present invention, all interstitial water may be replaced by concentrated sample material. This is in contrast to all sorts of column fractionation procedures in which only an aliquot, and usually a small aliquot of the total interstitial volume, is filled with sample material.

(2) The depth of the resin bed has no substantial influence upon the manner of fractionation obtainable thereon.

(3) High molecular weight lignosulphonate fractions of usual spent sulphite liquor materials are separated from the higher molecular weight lignosulphonate fractions of purposely further polymerized lignosulphonate polymers.

The above listed experimental evidences are discussed in connection with Tables VI and VII, and indicate that the availability of a large number of theoretical plates on the fractionation column, which is the prerequisite of successful column type fractionation operatons, is not essential in our operational procedure. Experimental evidence is shown in Table X and indicates that the process of the present invention is not basically a molecular sieve process, since the high molecular weight lignosulphonate fractions contained in usual lignosulphonate materials may or may not be retained in the interstitial liquid by a molecular sieve effect. Experimental evidence equally shows that the fractionation according to the present process is not based upon ion exclusion effects, nor upon dialysis through semipermeable membranes.

TABLE X (1) Preparation of high molecular weight lignosulphonate fraction of four different spent sulphite liquor materials.
(2) Fractionation of 1:1 mixtures of different high molecular weight fractions on ion exchange resin beds having different crosslinkage percentages.

| Experiment No. | Description of lignosulphonate material | Description of resin bed | Weight percent total solids | Molecular weight | Notes |
|---|---|---|---|---|---|
| 1 | Regular, untreated spent sulphite liquor. | 2% crosslinkage 50-100 mesh. | 50 | 5,600 | High molecular weight material A. |
| 2 | Caustic heat treated spent sulphite liquor. | do | 50 | 4,300 | High molecular weight material B. |
| 3 | Polymerized spent sulphite liquor. | do | 50 | 22,800 | High molecular weight material C. |
| 4 | Polymerized spent sulphite liquor. | do | 50 | 40,000 | High molecular weight material D. |
| 5 | 1 part B, 1 part D | do | 46.8 / 46.8 / 6.4 | 15,700 / 8,800 / (1) | |
| 6 | 1 part A, 1 part C | do | 38.6 / 28.8 / 29.0 / 3.7 | 16,000 / 11,200 / 9,200 / 7,700 | |
| 7 | 1 part A, 1 part C | 4% crosslinkage 50-100 mesh. | 35.6 / 26.4 / 38.0 | 12,500 / 10,750 / 13,700 | |
| 8 | 1 part A, 1 part C | 10% crosslinkage 50-100 mesh. | 58.2 / 41.8 | 13,500 / 11,800 | |

[1] Not established.

Basic differences in the use of ion exchange resin beds for the fractionation of spent sulphite liquor solids are set forth in Table XI which compares prior art conditions and results with those of the present invention:

TABLE XI

| No. | Author and reference | Depth of resin bed, mm. | Length of fractionation period, min. | Grams solids fractionated on 1 liter resin bed in 24 hrs. |
|---|---|---|---|---|
| 1 | Felicetta et al. (TAPPI, June 1959). | 1,700 | 115 | 127 |
| 2 | J. Benko (TAPPI, Nov. 1961). | 1,200 | 240 | 30 |
| 3 | Felicetta et al. (TAPPI, Apr. 1967). | 5,530 | 2,000 | 38.6 |
| 4 | Present disclosure | 150-1,500 | 10-30 | [1]10,000 |

[1] Approx.

Theoretical considerations and calculations in Reference 1 explicitly state, and close similarities in the other two references clearly indicate that the earlier workers were looking for a classical column distribution type of operation, in which the number of theoretical plates is most important. Fractionation, according to the process of the present invention, does not depend upon the availability of a large number of theoretical plates for achieving separation.

The production rates shown in Table XI were pro-rated for 24 hours from the highest production rates on record in each reference. The actual rates of production while using ion exchange resin beds for the fractionation of spent sulphite liquors or chemically treated products derived therefrom would be about 20% less, because about 20% of the operational time is necessary for the back-washing cycles, which, in our experience, are necessary following every 3-6 fractionation cycles in order to keep the resin bed in a sufficiently loose state.

Comparison of the fractionation procedures 1 and 4 is sufficient since the differences between these two procedures exist in an even more pronounced manner between procedures 2 and 3 on the one hand and procedure 4 on the other. The approximate 100 fold increase in the rates of production while using the ion exchange resin bed according to the present preferred method and as compared with procedure 1 is striking.

High molecular weight fractions prepared from spent sulphite liquors and from chemically treated products therefrom, according to the present invention, were shown to have substantial improvements in the following end use properties:

(1) Dye dispersant applications,
(2) In a variety of other dispersant applications,
(3) Marked reduction of hygroscopicity and of the difficulties resulting from hygroscopicity (caking),
(4) Improved battery performance of lead batteries in which said fractionated materials were employed.

Low molecular weight fractions prepared from spent sulphite liquors and from chemically treated products therefrom, were found to be useful either with or without subsequent chemical treatment, as humectants in dye pastes.

Tables XII, XIII and XIV give the results of experiments conducted using a weak cation exchange resin, namely, a 4-6% crosslinked carboxylic methacrylate (commercially available as "Amberlite IRC-50") in accordance with the invention.

TABLE XII.—FRACTIONATION OF AIR BLOWN, CAUSTIC HEAT TREATED SPENT SULPHITE LIQUOR SOLIDS ON "AMBERLITE IRC-50" RESIN BED

| Fractions | Molecular weight | Equivalent weight |
|---|---|---|
| I | 5,500 | 290 |
| II | 4,320 | 220 |
| III | 3,900 | 186 |
| IV | 3,540 | 159 |

TABLE XIII.—FRACTIONATION OF CAUSTIC HEAT TREATED SPENT SULPHITE LIQUOR ON "AMBERLITE IRC-50" RESIN BED

| Fractions | Molecular weight | Equivalent weight |
|---|---|---|
| I | 3,660 | 259 |
| II | 2,750 | 219 |

TABLE XIV.—FRACTIONATION OF CHEMICALLY UNTREATED SPENT SULPHITE LIQUOR ON "AMBERLITE IRC-50" RESIN BED

| Fractions | Swedish sugar percent on solids | Molecular weight |
|---|---|---|
| I | 19.5 | 4,600 |
| II | 31.3 | 4,500 |

These examples show that the extent of fractionation is about the same as on a "Dowex 50" resin bed of similar crosslinkage. Thus, the building stones of the polymer network or the functional acid groups are quite immaterial in obtaining fractionation. The essential conditions are (a) that the polymer network be hydrophilic, that is, water should be able to penetrate into the resin voids, and (b) that the extent of crosslinkage be low so that low molecular weight components are able to penetrate into the resin liquid. The polymer networks supporting the ion exchange groups are made hydrophilic by the ion exchange groups themselves.

Avoidance of cation exchange reactions with use of the resins specified is quite easy and thus such cation exchange resin beds are appropriate for diffusion beds as long as their degree of crosslinkage is in the required order.

Tables XV and XVI give the results of experiments conducted using a strong anion exchange resin bed comprising a styrene-divinylbenzene alkyl quaternary amine having 3–5% crosslinkage (commercially available as "Amberlite IRA–400").

TABLE XV.—FRACTIONATION OF AIR BLOWN, CAUSTIC HEAT TREATED SPENT SULPHITE LIQUOR SOLIDS ON "AMBERLITE IRA–400" RESIN BED

| Fractions | Molecular weight | Equivalent weight |
|---|---|---|
| I | 5,270 | 204 |
| II | 4,900 | 177 |
| III | 5,200 | 163 |
| IV | 5,250 | 137 |

TABLE XVI.—FRACTIONATION OF CHEMICALLY UNTREATED SULPHITE LIQUOR ON "AMBERLITE IRA–400" RESIN BED

| Fractions | Swedish sugar percent on solids | Molecular weight |
|---|---|---|
| I | 20.0 | 4,100 |
| II | 28.45 | 3,860 |

Tables XV and XVI indicate that some fractionation occurs but the extent of fractionation is remarkably less than on, for instance, a 4% crosslinked "Dowex 50" resin bed.

Fractionation of lignosulphonates was not observed to any substantial extent and it was restricted to the removal of the low molecular weight sugar acids or the removal of the reducing sugars from the front of the effluent. The anion exchange resin bed of 3–5% crosslinkage has provided a fractionation similar to that obtained on an 8–10% crosslinked cation exchanger of the same styrene-divinylbenzene structure. The probable reason for this difference is that it is practically impossible to avoid anion exchange reactions on the resin bed while aiming actually for fractionation. Whether the resin is used as HCl salt or in its OH form, the resin bonds some lignosulphonate molecules instantaneously and, by this, the effective pore-size of the resin particles decreases. Since cation exchange on cation exchange resin beds is easy to avoid and thus it does not interfere with the progress of fractionation, while in the case of anion exchangers the opposite is the case, anion exchange resin beds are generally unsuitable for fractionation of spent sulphite liquor solids according to the present process.

Fractionation in accordance with the invention has also been found to be successful in the following cases:

(A) Black liquor from the kraft pulping process was fractionated on sulphonated styrene-divinylbenzene and on carboxylic methacrylate resin beds with the following results:

SULPHONATED STYRENE-DIVINYLBENZENE RESIN, 2% CROSSLINKAGE

| Fractions | Percent solids included | Molecular weight |
|---|---|---|
| I | 48.2 | 3,560 |
| II | 51.8 | 1,360 |

CARBOXYLIC METHACRYLATE RESIN, 5% CROSSLINKAGE

| Fraction | Percent solids included | Molecular weight |
|---|---|---|
| I | 45.0 | 2,800 |
| II | 55.0 | 2,200 |

While equivalent weights on the high molecular weight fractions were not established, since they are very difficult to measure, equivalent weights of the low molecular weight fractions were less than 100, indicating the accumulation of sugar acids in the said fractions.

(B) Vanillin plant effluent was fractionated on sulphonated styrene-divinylbenzene resin bed.

| Fraction | Percent solids collected | Molecular weight |
|---|---|---|
| I | 25.0 | 6,000 |
| II | 75.0 | 900 |

(C) Bark, collected from spruce and balsam trees in about 50:50 proportions, was extracted with calcium bisulphite cook and the resulting extract was fractionated with the following results on a sulfonated styrene-divinylbenzene resin bed.

| Fraction | Weight percent solids included | Equivalent weight | Molecular weight | Optical density adsorption | Sugar content, as glucose |
|---|---|---|---|---|---|
| I | 4.5 | 262 | 4,400 | 0.146 | 50.0 |
| II | 16.8 | 264 | 3,620 | 0.143 | 54.5 |
| III | 31.3 | 195 | 3,020 | 0.114 | 40.3 |
| IV | 47.4 | 328 | 780 | 0.054 | 81.3 |

Notes.—(1) Optical density adsorption, measured at 281 mμ and expressed as the quantity of light adsorbed by 1 milligram material dissolved in 100 ml. water is a measure of the phenolic content in the material. (2) The reducing sugar content, expressed as glucose percentage, is probably being interfered with by the presence of other reducing groups on the polyphenol-type materials contained mostly in the first fractions. Thus, the true reducing sugar content of Fraction I is in all probability less than 50%, as shown above.

(D) Bark, collected from spruce and balsam trees in about 50:50 proportions was extracted by means of a caustic cook and was fractionated thereafter on a sulphonated styrene-divinylbenzene resin bed with the following results:

| Fraction | Weight percent solids included | Equivalent weight | Molecular weight | Optical density adsorption |
|---|---|---|---|---|
| I | 14.8 | 339 | 7,400 | 0.151 |
| II | 19.8 | 264 | 4,550 | 0.147 |
| III | 38.4 | 145 | 3,500 | 0.093 |
| IV | 27.0 | 107 | 940 | 0.031 |

Fractionation in accordance with the invention with use of non-aqueous solvents may be effected. Examples of suitable solvents are methanol, ethanol, propanol, and isopropanol.

The following is an example of bark extract treatment:

Bark extracts were prepared from oven-dry bark, consisting of a mixture of about 50 percent spruce and 50 percent balsam bark, by extracting the bark with slightly acidified (about 0.025 normal HCl) alcohols at refluxing temperature for a few hours. Fractionation of the bark extracts in alcohol was successful on sulphonated styrene-divinylbenzene resin beds swollen in the same alcohol, as shown by the following data:

Molecular weight

Isopropanol bark extract:
    High molecular weight fraction _____ 630
    Low molecular weight fraction _____ 270

Methanol bark extract:
    High molecular weight fraction _____ 1,860
    Low molecular weight fraction _____ 720

Some phenolic materials contained in the bark extract tend to react with the sulphonated styrene-divinyl-benzene resin bed and turn its pale yellow color into dark brown. While discoloration of the resin bed does not prevent it to function properly for fractionation purposes, in some cases, depending from the exact composition of the bark extract, there may be a tendency for a continuous build-up of adsorbed material on the resin bed. After a number of fractionating cycles such an accumulation of adsorbed material on the resin bed may have an adverse effect upon the progress of fractionation. In such cases the removal of said adsorbed material becomes a necessity and usually may be accomplished by means of washing with 5–8 percent aqueous caustic solutions.

What is claimed is:

1. A method of separating components of substances having different rates of diffusion which comprises passing alternately a solution of one of said substances consisting of spent sulphite liquor, kraft liquor, or bark extract and wash water through a diffusion unit comprising a bed of particles of a hydrophilic cation exchange resin having 2 to 8% cross-linkage, said particles having a size range of +20-100 mesh and being substantially uniformly distributed throughout said bed, controlling the overall dilution of said solution during said passage through said bed at about 2 to 4 fold of the original volume thereof, and recovering fractions of different molecular sizes of said substance from the effluent of said bed.

2. A method of separating components of substances as defined in claim 1, said particle size range being +50-100 mesh.

3. A method of separating components of substances as defined in claim 1, said crosslinkage percentage being 2 to 4.

4. A method of separating components of substances as defined in claim 1, said bed having a depth of about 150 to about 2000 mm.

5. A method of separating components of substances as defined in claim 1, said bed having a depth of about 600 to about 1200 mm.

6. A method of separating components of substances as defined in claim 1, wherein the temperature of said bed is maintained in the range of about 40° C. to about 90° C.

7. A method of separating components of substances as defined in claim 1, wherein the concentration of solids in said solution is 40–50%.

8. A method of separating components of substances as defined in claim 1, wherein said resin is selected from the group consisting of sulfonated styrene-divinylbenzene and carboxylic methacrylate.

9. A method of separating components of substances as defined in claim 1, wherein said solution is passed through said bed batchwise in cycles each not exceeding 30 minutes duration.

10. A method of separating components of substances as defined in claim 9, wherein during each said fractionation cycle 50 to 500 grams solids in said solution per one liter of resin bed is passed through said bed.

11. A method of separating components of substances as defined in claim 10, wherein said solids amount is about 100 grams.

12. A method of separating components of substances as defined in claim 1, wherein said solution is passed through said bed under atmospheric pressure.

13. A method of separating components of substances as defined in claim 1, wherein said solution is passed through said bed under slightly elevated pressure.

14. A method of separating components of substances as defined in claim 7, wherein said solution is of spent sulphite liquor, and wherein a carbohydrate fraction is also recovered from said effluent.

15. A method of separating components of substances as defined in claim 7, wherein said solution is of air blown caustic heat treated spent sulphite liquor, and wherein a fraction comprising sodium salts of sugar acids is also recovered from said effluent.

16. A method of separating components of substances as defined in claim 7, wherein said solution is of kraft liquor and said fractions comprise high molecular weight lignin fractions and low molecular weight fractions comprising salts of sugar acids and inorganic components.

17. A method of separating components of substances as defined in claim 7, wherein said solution is of a bark extract prepared by sodium bisulphite extraction and said fractions comprise a first fraction containing high molecular weight polyphenol components and subsequent fractions containing low molecular weight phenolic components and carbohydrates.

18. A method of separating components of substances as defined in claim 7, wherein the solvent in said solution is a non-aqueous polar solvent of low molecular weight.

References Cited

Wheaton et al., "Ind. & Eng. Chem.," vol. 45 (1953), pp. 228–33.

Kunin, "Ion Exchange Resins," 2nd ed. (1958), pp. 298–300.

Jensen et al., "TAPPI," vol. 45 (1962), pp. 122–27.

Felicetta et al., "TAPPI," vol. 42 (1959), pp. 496–502.

Felicetta et al., "TAPPI," vol. 50 (1967), pp. 170–173.

CHARLES B. PARKER, Primary Examiner

D. R. PHILLIPS, Assistant Examiner

U.S. Cl. X.R.

127—46; 210—36; 260—212